3,398,057
PROCESS FOR PRODUCING TETRACYCLINE
Enzo Zannini, Ermanno Piacenza, and Giuseppe Fabbri, Milan, Italy, assignors to Ankerfarm S.p.A., Milan, Italy, a corporation of Italy
No Drawing. Filed Dec. 9, 1963, Ser. No. 329,222
Claims priority, application Italy, Oct. 19, 1963, 21,465/63
2 Claims. (Cl. 195—80)

---

ABSTRACT OF THE DISCLOSURE

A process for forming tetracycline through the action of the microorganism ATCC 15299 on a nutrient medium containing an aqueous extract of Zea mays and strontium carbonate, and having a pH of between 5.7 to 7.0 after the medium has been sterilized.

---

This invention relates to a process for producing tetracycline and more particularly to a novel fermentation process for producing tetracycline in high yield through the use of the microorganism Streptomyces sp. 1616.

Streptomyces sp. 1616 was located in the soil of Somma Lombardo, Italy, proximate to Milan, Italy. Streptomyces sp. 1616 differs from any microorganism heretofore reported in the literature as being useful for the production of tetracycline. It produces tetracycline in the presence of chloride ions. Moreover, we have discovered that the presence of strontium carbonate in the fermentation medium markedly improves the yield of tetracycline in fermentation processes employing Streptomyces sp. 1616. This likewise has not heretofore been reported in the literature in connection with any other microorganism.

The principal morphological, physiological, biochemical and cultural characteristics of Streptomyces sp. 1616 are as follows:

(1) Vegetative mycelium: Colorless up to twenty-four hours and of a bright red color afterwards with different red degrees in conformity with the different media.

(2) Aerial mycelium: When present it is white, successively grey and brown.

(3) Spores: When present they are of a greyish-brown color with a dry surface without water condensation.

(4) The growth temperature can be within the range of from 22° to 35° C., with the optimum being 26°–28° C.

Its appearance in the different culture media is as follows:

Glucose—Peptone agar: Reddish brown pigment, red orange vegetative mycelium, aerial mycelium from white to rosy.

Potatoes—plugs: Vegetative mycelium dark brown, aerial mycelium rosy.

Glucose-Asparagine agar: Scanty growth, vegetative mycelium greyish yellow, no aerial mycelium.

Czapek—Dox synthetic agar: No growth produced at all.

Nutrient agar: Scarce growth, sparse brown colonies.

Glucose—meat extract agar: Moderate growth, vegetative mycelium bright brown.

Agar-potato: Scanty growth, vegetative mycelium reddish-brown, no aerial mycelium.

In Virgilio, Hennegeller, Il Farmaco, Ed. Sc. vol. 3, pp. 164–171 (1960) and in British Patent 775,139 there is described the microorganism Streptomyces psammoticus, which is described as being capable of producing tetracycline in the presence of chloride ions. We have made a comparison between the strains Streptomyces sp. 1616 and the morphological and cultural characteristics of Streptomyces psammoticus, as described in the literature, and we have conclusively established that the two strains are different. Thus, a side by side comparison of these organisms reveals the following:

| | Str. psammoticus | Str. sp. 1616 |
|---|---|---|
| Sporophores [1] | Rectus flexibilis | Retinaculum apertum. |
| Spore color [1] | Olive-buff | Red-grey. |
| Sporophores [2] | Sympodialis-branched flexuous. | Monopodialis-branched open spirals. |
| Spore color [2] | Griseus | Cinnamoneus-cinereus. |

[1] Pridham et al., Applied Microbiology, vol. 6, pp. 52–79 (1958).
[2] Ettlinger et al., Archiv. Mikrobiologie, vol. 31, pp. 326–358. (1958).

After this first investigation we have compared our strain Streptomyces sp. 1616 also with all strains which produce chlortetracycline (and tetracycline in dechlorinated media and in the presence of chlorination inhibitors).

The strains belonging to this group, and the literature references therefor are as follows:

Streptomyces aureofaciens described in Duggar, Ann. N.Y. Acad. Sc., vol. 51 p. 177 (1948), and U.S. patent 2,482,055.

Streptomyces viridifaciens described in U.S. patent 2,712,517.

Streptomyces persimilis described in British patent 799,051.

Streptomyces RO 1441 described in British patent 772,149.

Streptomyces P 4871 described in British patent 790,953.

Streptomyces ATCC 11652, 11653, and 11654 described in British Patent 787,895.

We have compared Streptomyces aureofaciens ATCC 10762 with Streptomyces sp. 1616 by performing the morphological, physiological and cultural tests on the media, which have been used by the different investigators for the classification of Streptomyces aureofaciens; the other strains have been compared with the data found in the existing literature. The results obtained are shown in the following tables:

Peptone ------------------------------------------------- gm ----- 10
Glucose ------------------------------------------------- gm ----- 20
NaCl ---------------------------------------------------- gm ----- 5
Agar ---------------------------------------------------- gm ----- 18

| Strain | Growth | Vegetative mycelium | Aerial mycelium | Spores |
|---|---|---|---|---|
| Str. 1616 | Moderate | Light orange to red. | White to rosy-white. | XXX. |
| Aureofaciens ATCC 10762. | Fair | Topaze to orange yellow. | White to greyish white. | |
| ATCC 11652 | XX | XX | XX | XX. |
| ATCC 11653 | XX | XX | XX | XX. |
| ATCC 11654 | XX | XX | XX | XX. |
| Feofaciens | XX | XX | XX | XX. |
| RO 1441 | XX | XX | XX | XX. |
| P 4871 | XX | XX | XX | XX. |
| Persimilis | XX | XX | XX | XX. |
| Viridifaciens | XX | XX | XX | XX. |
| Fuscofaciens | XX | XX | XX | XX. |

XX—Not described.
XXX—No growth.

GELATINE-DIFCO

| | |
|---|---|
| Str. 1616 | Complete liquefaction. |
| Aureofaciens ATCC 10762 | No detectable liquefaction. |
| ATCC 11652 | XX. |
| ATCC 11653 | XX. |
| ATCC 11654 | XX. |
| Feofaciens | XX. |
| RO 1441 | No liquefaction. |
| P 4871 | Do. |
| Persimilis | No detectable liquefaction. |
| Viridifaciens | XX. |
| Fuscofaciens | No liquefaction. |

XX—Not described.

GLUCOSE-ASPARAGINE-AGAR

```
Glucose ----------------------------------- gm ----- 10
Asparagine -------------------------------- gm ----- 0.5
K₂HPO₄ ------------------------------------ gm ----- 0.5
Meat Extract ------------------------------ gm ----- 2
Agar -------------------------------------- gm ----- 18
Distilled H₂O to 1,000 cc.
pH=6.8.
```

| Strain | Growth | Vegetative mycelium | Aerial mycelium | Spores |
|---|---|---|---|---|
| Str. sp. 1616 | Good | Light orange with red dots | Rosy grey | XXX. |
| Aureofaciens ATCC 10762 | Abundant | Colorless | White to light grey | Mouse grey. |
| ATCC 11652 | Fair | Buff to cinnamon-buff | Scarce, white | White to brownish grey to mouse grey. |
| ATCC 11653 | Moderate | Orange | White | White to light brown. |
| ATCC 11654 | Moderate to good | Colorless to dark brown | XXX | XXX. |
| Feofaciens | Scarce | Light yellow to light brown | White to light yellow | Very scarce, light brown to dark brown. |
| Viridifaciens | Good | X | Light grey | Light grey. |
| RO 1441 | X | Yellow to brown-yellow | White | Grey. |
| P 4871 | Good | Abundant | White to dark grey | Do. |
| Persimilis | X | Yellow to light brown | White to light grey | Dark grey. |
| Fuscofaciens | Scarce to moderate | Purple-brown | XXX | XXX. |

X—Not reported by the authors. XXX—No growth.

NUTRIENT AGAR

```
Peptone ----------------------------------- gm ----- 5
Meat Extract ------------------------------ gm ----- 5
NaCl -------------------------------------- gm ----- 5
Agar -------------------------------------- gm ----- 20
Distilled H₂O to 1,000 cc.
pH=7.2–7.4.
```

| Strain | Growth | Vegetative mycelium | Aerial mycelium | Spores |
|---|---|---|---|---|
| Str. sp. 1616 | Scarce | Orange red to brown-red | XXX | XXX. |
| Aureofaciens ATCC 10762 | Moderate | Topaze | White to greyish white | X. |
| ATCC 11652 | Scarce to moderate | Creamy white | XXX | XXX. |
| ATCC 11653 | do | Buff colored | XXX | XXX. |
| ATCC 11654 | do | Creamy white | XXX | XXX. |
| Feofaciens or psammoticus | XX | XX | XX | XX. |
| RO 1441 | Abundant | Brown | Snow white | X. |
| P 4871 | Abundant and characteristic | X | XX | X. |
| Viridifaciens | Good | Tan to light brown | X | X. |
| Fuscofaciens | Scarce to moderate | XX | XX | XX. |
| Persimilis | do | Brown | Snow white | X. |

X—Not reported. XX—Not described. XXX—No growth.

CZAPEK-DOX SYNTHETIC AGAR

```
Sucrose ----------------------------------- gm --- 30
NaNO₃ ------------------------------------- gm --- 2
K₂HPO₄ ------------------------------------ gm --- 1
MgSO₄·7H₂O -------------------------------- gm --- 0.5
KCl --------------------------------------- gm --- 0.5
FeSO₄ ------------------------------------- gm --- 0.01
Agar -------------------------------------- gm --- 20
Distilled water to 1,000 cc.
pH=7.0–7.3.
```

| Strain | Growth | Vegetative mycelium | Aerial mycelium | Spores |
|---|---|---|---|---|
| Str. sp. 1616 | No growth | No growth | No growth | No growth. |
| Aureofaciens ATCC 10762 | Abundant | White | White to light grey | Col. Piping Rock 13A2 to mouse grey.* |
| ATCC 11652 | Scarce | XX | XXX | XXX. |
| ATCC 11653 | do | XX | White | Mouse grey. |
| ATCC 11654 | do | XX | No growth on surface | XXX. |
| Feofaciens or psammoticus | X | Slight | XXX | XXX. |
| RO 1441 | Scarce | XXX | XXX | XXX. |
| P 4871 | Very scarce | XXX | XXX | XXX. |
| Persimilis | Moderate to good | XX | Mouse grey | Good. |
| Viridifaciens | Scarce | XX | X | X. |

X—Not reported. XX—Not described. XXX—No growth.
*Maerz A., & Paul M. R., A Dictionary of Colors, McGraw-Hill (1950).

GLUCOSE-PEPTONE-AGAR

```
Glucose ----------------------------------- gm ----- 30
Peptone ----------------------------------- gm ----- 10
Agar -------------------------------------- gm ----- 20
Distilled water to 1,000 cc.
pH=5.9.
```

| Strain | Growth | Vegetative mycelium | Aerial mycelium | Spores |
|---|---|---|---|---|
| Str. sp. 1616 | Moderate | Light orange to red | White to grey-white to grey-rose | XXX. |
| Aureofaciens ATCC 10762 | Good | Ochre yellow | White | XXX. |
| ATCC 11652 | XX | XX | XX | XX. |
| ATCC 11653 | XX | XX | XX | XX. |
| ATCC 11654 | XX | XX | XX | XX. |
| Feofaciens or psammoticus | XX | XX | XX | XX. |
| RO 1441 | XX | XX | XX | XX. |
| P 4871 | XX | XX | XX | XX. |
| Persimilis | XX | XX | XX | XX. |
| Fuscofaciens | XX | XX | XX | XX. |

XX—Not described. XXX—No growth.

STARCH AGAR

```
Soluble starch _____gm____ 10
NaNO₃ _____gm____  1
K₂HPO₄ _____gm____  0.3
NaCl _____gm____  0.5
MgCO₃ _____gm____  1
Agar _____gm____ 15
Distilled water to 1,000 cc.
```

| Strain | Growth | Vegetative mycelium | Aerial mycelium | Spores |
|---|---|---|---|---|
| Str. sp. 1616 | Very scarce | Colorless | XXX | XXX. |
| Aureofaciens ATCC 10762 | Abundant | Light brown to col. Piping Rock 13A2.* | White to grey | Mouse grey. |
| ATCC 11652 | Moderate | X | X | Good sporulation white to mouse grey to black. |
| ATCC 11653 | do | White to mouse grey | White | Light to dark mouse grey. |
| ATCC 11654 | Scarce to moderate | White at margins becoming yellowish-grey to brownish-grey. | XXX | XXX. |
| Feofaciens or psammoticus | Very scarce | Colorless | XXX | XXX. |
| RO 1441 | X | Very slow and scarce | X | X. |
| P 4871 | XX | XX | XX | XX. |
| Persimilis | Very scarce | X | X | X. |
| Viridifaciens | XX | XX | XX | XX. |
| Fuscofaciens | Scarce to moderate | Light ink blue | XXX | XXX. |

X—Not reported.   XX—Not described.   XXX—No growth.
*Maerz A., & Paul M. R., A Dictionary of Colors, McGraw-Hill (1950).

AGAR POTATO

```
Potatoes to _____gm___ 200
Glucose _____gm___  20
Agar _____gm___  20
```

| Strain | Growth | Vegetative mycelium | Aerial mycelium | Spores |
|---|---|---|---|---|
| Str. sp. 1616 | Scarce | Orange to reddish-orange | XXX | XXX. |
| Aureofaciens ATCC 10762 | Abundant | Colorless to light grey | White to grey | Mouse grey. |
| ATCC 11652 | XX | XX | XX | XX. |
| ATCC 11653 | XX | XX | XX | XX. |
| ATCC 11654 | XX | XX | XX | XX. |
| Feofaciens or psammoticus | Very scarce | Brown | X | Very scarce brown. |
| RO 1441 | XX | XX | XX | XX. |
| P 4871 | XX | XX | XX | XX. |
| Persimilis | XX | XX | XX | XX. |
| Viridifaciens | Raised, surface modulate | Ecrubeige | X | X. |
| Fuscofaciens | Good | Olive-grey and yellow or light brown to dark brown. | XXX | XXX. |

X—Not reported.   XX—Not described.   XXX—No growth.

POTATOES PLUGS

| Strain | Growth | Vegetative mycelium | Aerial mycelium | Spores |
|---|---|---|---|---|
| Str. sp. 1616 | Good | Brigand Red 2J11* | White to rosy-grey to ash-grey. | Ash-grey. |
| Aureofaciens ATCC 10762 | Scarce to moderate | Yellowish-brown to brown | Greyish white at margins | X. |
| ATCC 11652 | Good | Light yellow-brown to dark olive brown. | White | None to white to brownish grey. |
| ATCC 11653 | Moderate | Creamy white to creamy yellow to mustrad yellow. | XXX | XXX. |
| ATCC 11654 | Good | Olive brown | XXX | XXX. |
| Feofaciens or psammoticus | XX | XX | XX | XX. |
| RO 1441 | XX | XX | XX | XX. |
| P 4871 | XX | XX | XX | XX. |
| Persimilis | XX | XX | XX | XX. |
| Viridifaciens | XX | XX | XX | XX. |
| Fuscofaciens | XX | XX | XX | XX. |

X—Not reported.   XX—Not described.   XXX—No growth.
*Maerz A. & Paul M. R., A Dictionary of Colors, McGraw-Hill (1960).

As will be obvious from the above tables and data, the Str. sp. 1616, owing to its morphological, biochemical and cultural characteristics, cannot be identified as belonging to any recognized group of micro-organisms described as tetracycline producers.

We have discovered that the stabilizing action of strontium carbonate, and mixtures of strontium carbonate and calcium carbonate, upon the pH, of both the growth media and the fermentation media, results in improved growth in the case of the growth media and improved yield of tetracycline in the case of the fermentation media. This is unexpected property, not heretofore reported in the literature for any comparable microbiological process.

Furthermore, we have discovered that maximum yields are obtained when the fermentation media comprise either fresh or ensiled Zea mays. We have found that the Zea mays contains growth factors not present in other plants. Thus, when we have substituted soya for the Zea mays, the yield of tetracycline decreased substantially. The growth factor contained in Zea mays is capable of being extracted therefrom by both acid and alkaline extraction agents, as well as neutral extraction agents.

Both the growth medium and the fermentation medium should be at an initial pH of 6.0 to 7.0. During fermentation, the pH of the medium should be between 5.7 and 6.8. The temperature of the growth medium and the fermentation medium should be between 24° to 35° C., and preferably about 26° to 28° C.

For the growth medium, we have found a preferred medium to contain per 1000 cc.:

|  | Grams |
|---|---|
| Corn dextrin | 10–40 |
| Strontium carbonate | 2–12 |

Zea mays filtrate is prepared by boiling 720 grams of Zea mays in 2 liters of water and then filtering the mixture so as to obtain a brown colored filtrate having a pH of about 6.2 and a total nitrogen concentration of about .02% and then is added to a medium of about 250 to 750 cc.

Ammonium sulfate—1 to 5 grams
Water in a sufficient quantity to make 1000 cc.

Before sterilization the pH should be adjusted to about 5.0 with hydrochloric acid. After sterilization, the pH should be within the range of 6 to 7. The presence of the strontium carbonate both regulates the pH and beneficially affects the yield of tetracycline.

The following examples reveal the growth of Streptomyces sp. 1616, and may be used to provide an inoculant for the fermentation media:

Example I

Spores of the strain Streptomyces sp. 1616 were washed from the slant with sterile 1% peptonized water to form a suspension containing about 500,000,000 spores per cc. 1 cc. of this suspension was used to inoculate a 3 liter flask containing 500 cc. of the following medium:

| | |
|---|---|
| Corn dextrin _____ grams__ | 20 |
| Strontium carbonate _____ do____ | 10 |
| Zea mays filtrate, prepared as set forth above _____ cc__ | 250 |
| Ammonium sulfate _____ grams__ | 2 |
| Water sufficient to make 1000 cc. | |

The pH of this medium prior to sterilization was adjusted to 5.0 with hydrochloric acid. The pH of the medium after sterilization was 6.35 to 6.5.

The growth was continued in the medium for between 24 and 48 hours.

Example II

The procedure of Example I was repeated except that the medium contained:

| | |
|---|---|
| Corn dextrin _____ grams__ | 20 |
| Strontium carbonate _____ do____ | 10 |
| Zea mays filtrate, prepared as set forth above _____ cc__ | 500 |
| Ammonium sulfate _____ grams__ | 2 |
| Water sufficient to make 1000 cc. | |

Example III

The procedure of Example I was repeated except that the medium contained:

| | |
|---|---|
| Corn dextrin _____ gm__ | 20 |
| Strontium carbonate _____ gm__ | 10 |
| Zea mays filtrate, prepared as set forth above __ cc__ | 750 |
| Ammonium sulfate _____ gm__ | 2 |
| Water sufficient to make 1000 cc. | |

Tetracycline was obtained in high yield when from 2 to 4 weight percent of mycelium, grown between 24 and 48 hours in the nutrient media described in the aforesaid Examples I, II and III were inoculated into the following fermentation media:

Example IV

| | |
|---|---|
| Neutral filtrate of Zea mays [1] _____ cc__ | 250 |
| NH$_4$Cl _____ gm__ | 4,5 |
| Corn starch _____ gm__ | 55 |
| Soy-bean _____ gm__ | 10 |
| SrCO$_3$ _____ gm__ | 8 |
| Spring water to 1000 cc. | |

[1] The neutral filtrate of Zea mays is prepared by boiling 720 grams of Zea mays with 2 liters of water, filtering to produce a liquid of a brown color having a pH of 6.2, and a total nitrogen concentration of .02 weight percent.

The pH before the sterilization must be adjusted to 5.0–5.5 pH after the sterilization—6.2.

Example V

| | |
|---|---|
| Neutral filtrate of Zea mays [1] _____ cc__ | 500 |
| NH$_4$Cl _____ gm__ | 4,5 |
| Corn starch _____ gm__ | 55 |
| Soy-bean _____ gm__ | 10 |
| SrCO$_3$ _____ gm__ | 8 |
| Spring water to 1000 cc. | |

[1] See footnote 1 of Example IV.

The pH before the sterilization must be adjusted to 5.0–5.5 pH after the sterilization—6.2

Example VI

| | |
|---|---|
| Neutral filtrate of Zea mays [1] _____ cc__ | 750 |
| NH$_4$Cl _____ gm__ | 4,5 |
| Corn starch _____ gm__ | 55 |
| Soy-bean _____ gm__ | 10 |
| SrCO$_3$ _____ gm__ | 8 |
| Spring water to 1000 cc. | |

[1] See footnote 1 of Example IV.

Example VII

| | |
|---|---|
| Alkaline filtrate of Zea mays [1] _____ cc__ | 250 |
| NH$_4$Cl _____ gm__ | 4,5 |
| Corn starch _____ gm__ | 55 |
| Soy-bean _____ gm__ | 10 |
| SrCO$_3$ _____ gm__ | 8 |
| Spring water to 1000 cc. | |

[1] The Alkaline filtrate of Zea mays is prepared by suspending 720 grams of Zea mays in 2 liters of water, and adjusting the pH to 9.0 with 20 weight percent sodium hydroxide. The mixture is then brought to boiling for 30 minutes and filtered. The filtrate is a brown-yellowish liquid having a pH of 9.0 with a total nitrogen concentration of .022 weight percent.

The pH before the sterilization must be adjusted to 5.0–5.5 pH after the sterilization—6.2

Example IX

| | |
|---|---|
| Alkaline filtrate of Zea mays [1] _____ cc__ | 750 |
| NH$_4$Cl _____ gm__ | 4,5 |
| Corn starch _____ gm__ | 55 |
| Soy-bean _____ gm__ | 10 |
| SrCO$_3$ _____ gm__ | 8 |
| Spring water to 1000 cc. | |

[1] See footnote 1 of Example VII.

The pH before the sterilization must be adjusted to 5.0–5.5 pH after the sterilization—6.2

Example X

| | |
|---|---|
| Acid filtrate of Zea mays [1] _____ cc__ | 250 |
| NH$_4$Cl _____ gm__ | 4,5 |
| Corn starch _____ gm__ | 55 |
| Soy-bean _____ gm__ | 10 |
| SrCO$_3$ _____ gm__ | 8 |
| Spring water to 1000 cc. | |

[1] The acid filtrate of Zea mays is prepared by suspending 720 grams of Zea mays in 2 liters of water, acidifying the mixture with 20 vol. percent of hydrochloric acid to bring it to a pH of 3, boiling and then filtering the mixture to yield a yellowish liquid having a nitrogen content of .02 weight percent.

The pH before the sterilization must be adjusted to 5.0–5.5 pH after the sterilization—6.2

Example XI

| | |
|---|---|
| Acid filtrate of Zea mays [1] _____ cc__ | 500 |
| NH$_4$Cl _____ g__ | 4.5 |
| Corn Starch _____ g__ | 55 |
| Soy-bean _____ g__ | 10 |
| SrCO$_3$ _____ g__ | 8 |
| Spring water to 1000 cc. | |

[1] See footnote 1 of Example X.

The pH before the sterilization must be adjusted to 5.0–5.5 pH after the sterilization—6.2

Example XII

| | |
|---|---|
| Acid filtrate of Zea mays [1] _____ cc__ | 750 |
| NH$_4$Cl _____ g__ | 4.5 |
| Corn Starch _____ g__ | 55 |
| Soy-bean _____ g__ | 10 |
| SrCO$_3$ _____ g__ | 8 |
| Spring water to 1000 cc. | |

[1] The acid filtrate of Zea mays is prepared by suspending 720 grams of Zea mays in 2 liters of water, acidifying the mixture with 20 wt. percent of hydrochloric acid to bring it to a pH of 3, boiling and then filtering the mixture to yield a yellowish liquid having a nitrogen content of 0.2 weight percent.

The pH before the sterilization must be adjusted to 5.0–5.5 pH after the sterilization—6.2

We have found that very high yields of tetracycline may be obtained from the aforesaid fermentation media. The tetracycline may be recovered from the fermentation media by the recovery method set forth in the copending application Ser. No. 329,298 and now U.S. Patent No. 3,272,862 filed on even date herewith in the names of Ezio Caputo, Giovanni Bonfanti, and Enzo Zannini, disclosure of which is incorporated herein by reference. However, other known methods for recovering tetracycline from a fermentation medium may be used, and form no part of the present invention.

We have determined that the highest yields of tetracycline are obtained when strontium carbonate is employed as the pH regulator for the fermentation medium. However, other alkaline earth metal carbonates, such as barium carbonate and calcium carbonate may be used, preferably in conjunction with strontium carbonate. If used in place of the strontium carbonate, the yield of tetracycline is reduced.

Furthermore, as above-indicated, the yield of tetracycline is markedly reduced if the *Zea mays* constituent is replaced by soy-bean or other nutrient. We believe that there is a growth factor present in *Zea mays* which materially increases the yield of tetracycline when the Streptomyces sp. 1616 is employed as the microorganism. However, we have successfully recovered tetracycline from nutrient media containing no *Zea mays* but other nutrients, such as soy-bean. When Streptomyces sp. 1616 is employed, it is not necessary to remove chloride ions from the nutrient medium.

A sample of the spores of Streptomyces sp. 1616 have been deposited with the American Type Culture Collection, Washington, D.C., and has been designated ATCC 15299.

The present invention may be embodied in other specific forms without departing from the spirit or essential attributes thereof and, accordingly, reference should be made to the appended claims, rather than to the foregoing specification as indicating the scope of the invention.

We claim:

1. A process for producing tetracycline which comprises producing tetracycline by microbiological fermentation through the action of the microorganism *Streptomyces ATCC* 15299 on a nutrient medium containing an aqueous extract of *Zea mays* and strontium carbonate, with such nutrient medium having a pH of between 5.7 to 7.0 after such medium has been sterilized, and recovering said tetracycline from said nutrient medium.

2. A process in accordance with claim 1 in which the nutrient medium contains chloride ions.

References Cited

UNITED STATES PATENTS

| | | | |
|---|---|---|---|
| 2,678,903 | 5/1954 | Gapen et al. | 195—36 |
| 3,037,916 | 6/1962 | Goodman | 195—80 |

FOREIGN PATENTS

| | | | |
|---|---|---|---|
| 201,870 | 5/1956 | Australia | 195—80 |

MAURICE W. GREENSTEIN, *Primary Examiner.*